(12) United States Patent
Bond et al.

(10) Patent No.: US 11,536,369 B2
(45) Date of Patent: Dec. 27, 2022

(54) GASKET

(71) Applicant: Flexitallic Investments, Inc., Houston, TX (US)

(72) Inventors: Stephen Peter Bond, Houston, TX (US); Stuart John Shaw, Leeds (GB); David Peter Gerrard, Montgomery, TX (US)

(73) Assignee: Flexitallic Investments, Inc., Houston, TX (US)

( * ) Notice: Subject to any disclaimer, the term of this patent is extended or adjusted under 35 U.S.C. 154(b) by 243 days.

(21) Appl. No.: 15/753,923

(22) PCT Filed: Aug. 12, 2016

(86) PCT No.: PCT/EP2016/069295
§ 371 (c)(1),
(2) Date: Feb. 20, 2018

(87) PCT Pub. No.: WO2017/029241
PCT Pub. Date: Feb. 23, 2017

(65) Prior Publication Data
US 2018/0245693 A1 Aug. 30, 2018

(30) Foreign Application Priority Data
Aug. 17, 2015 (GB) ...................... 1514584

(51) Int. Cl.
*F16J 15/12* (2006.01)
*F16L 23/18* (2006.01)
*F16L 25/02* (2006.01)

(52) U.S. Cl.
CPC .......... *F16J 15/122* (2013.01); *F16J 15/125* (2013.01); *F16L 23/18* (2013.01); *F16L 25/026* (2013.01)

(58) Field of Classification Search
CPC ......... F16J 15/122; F16J 15/125; F16L 23/18; F16L 25/026; F16L 15/00; F16L 15/003;
(Continued)

(56) References Cited

U.S. PATENT DOCUMENTS 2,520,089 A * 8/1950 Lippincott ................ G01F 1/42
138/40
4,095,809 A * 6/1978 Smith ..................... F16J 15/061
277/609

(Continued)

FOREIGN PATENT DOCUMENTS

CN 202834060 U 3/2013
DE 2756351 B1 * 5/1979 ............... F16J 15/12
(Continued)

OTHER PUBLICATIONS

International Preliminary Report on Patentability and Written Opinion in related International Application No. PCT/EP2016/069295 dated Feb. 20, 2018, 10 pages.
(Continued)

*Primary Examiner* — Eugene G Byrd
(74) *Attorney, Agent, or Firm* — Kilpatrick Townsend & Stockton LLP (57) ABSTRACT

A gasket having concentric or spiral serrations around the aperture on each side of the gasket, and wherein a facing is secured to such serrations, wherein each facing comprises a first layer which is in contact with a respective set of such serrations and a second layer which is in contact with the first layer. The first layer could be of a polyaryletherketone or polyimide, and the second layer could be of graphite or vermiculite. The serrations are designed to avoid damage to the first layer. An intact first layer can supply a property to the facing which may be absent in the second layer; for example, good dielectric properties.

19 Claims, 3 Drawing Sheets

(58) Field of Classification Search
CPC ....... F16L 15/008; F16L 17/067; F16L 19/00; F16L 25/0054; F16L 25/023; F16L 27/06
USPC ........................................................ 277/608
See application file for complete search history.

(56) References Cited

U.S. PATENT DOCUMENTS

| | | | | |
|---|---|---|---|---|
| 4,189,819 | A * | 2/1980 | Nicholson | F16J 15/0887 29/417 |
| 4,364,982 | A * | 12/1982 | Gee | F16J 15/125 277/610 |
| 4,575,917 | A * | 3/1986 | Kana | B23P 19/08 277/609 |
| 4,673,187 | A * | 6/1987 | Hanson | F16J 15/125 277/314 |
| 5,011,162 | A * | 4/1991 | Jelinek | F01M 11/0408 277/644 |
| 5,118,121 | A * | 6/1992 | Hellman, Sr. | F16J 15/0806 277/650 |
| 5,145,190 | A * | 9/1992 | Boardman | F16J 15/104 277/596 |
| 5,222,744 | A * | 6/1993 | Dennys | F16L 23/22 277/608 |
| 5,421,594 | A | 6/1995 | Becerra | |
| 5,511,797 | A * | 4/1996 | Nikirk | F16J 15/125 277/609 |
| 5,645,284 | A * | 7/1997 | Fitton | F16J 15/125 277/610 |
| 5,664,791 | A * | 9/1997 | Owen | F16J 15/125 277/609 |
| 5,823,542 | A * | 10/1998 | Owen | F16L 23/18 277/603 |
| 5,895,056 | A * | 4/1999 | Habuta | F02F 11/002 277/591 |
| 6,092,811 | A | 7/2000 | Bojarczuk et al. | |
| 6,367,803 | B1 * | 4/2002 | Loth | F16L 23/18 277/321 |
| 6,932,352 | B2 * | 8/2005 | Matsumoto | F02F 11/002 277/317 |
| 6,994,356 | B2 * | 2/2006 | Veiga | F16J 15/061 277/616 |
| 7,455,301 | B2 * | 11/2008 | Ragsdale | F16J 15/122 277/627 |
| 9,890,859 | B2 * | 2/2018 | Veiga | F16J 15/065 |
| 2004/0118510 | A1 * | 6/2004 | Pollock | F16J 15/122 156/256 |
| 2004/0256129 | A1 | 12/2004 | Matsumoto et al. | |
| 2006/0145429 | A1 | 7/2006 | Casler et al. | |
| 2007/0262538 | A1 * | 11/2007 | Taguchi | F02F 11/002 277/598 |
| 2008/0036161 | A1 | 2/2008 | Miyoshi et al. | |
| 2009/0295103 | A1 | 12/2009 | Ebina et al. | |
| 2010/0237570 | A1 | 9/2010 | Ueda et al. | |
| 2010/0264607 | A1 | 10/2010 | Ueda et al. | |
| 2011/0115170 | A1 * | 5/2011 | Krejci | F16J 15/122 277/647 |
| 2011/0156352 | A1 * | 6/2011 | Bond | F16J 15/064 277/312 |
| 2012/0068415 | A1 | 3/2012 | Deluca et al. | |
| 2012/0235365 | A1 * | 9/2012 | Stubblefield | F16J 15/122 277/644 |
| 2013/0249171 | A1 * | 9/2013 | Kolb | F16J 15/0806 277/608 |
| 2013/0328270 | A1 * | 12/2013 | Stubblefield | F16J 15/122 277/314 |
| 2014/0333035 | A1 * | 11/2014 | Schemmann | F16J 15/02 277/602 |
| 2015/0060352 | A1 * | 3/2015 | Yoder | B01D 35/28 210/456 |
| 2015/0330509 | A1 * | 11/2015 | Malus | F16J 15/0887 277/608 |
| 2017/0152973 | A1 | 6/2017 | Kolb et al. | |

FOREIGN PATENT DOCUMENTS

| | | | | |
|---|---|---|---|---|
| DE | 2756418 | A1 | 6/1979 | |
| DE | 3149753 | A1 | 6/1983 | |
| DE | 4139453 | A1 * | 6/1992 | ............. F16J 15/121 |
| DE | 4230322 | A1 | 3/1994 | |
| DE | 4240132 | A1 * | 6/1994 | ............. F16J 15/123 |
| DE | 102008037770 | A1 | 2/2010 | |
| EP | 2607753 | A1 * | 6/2013 | |
| GB | 2010417 | A * | 6/1979 | ............. F16J 15/121 |
| WO | WO-9429620 | A1 * | 12/1994 | ............. F16J 15/104 |
| WO | 2010100469 | A1 | 9/2010 | |
| WO | WO-2016003444 | A1 * | 1/2016 | ............. F16J 15/122 |

OTHER PUBLICATIONS

Examination Report from related EP Application No. 16753641.6, dated Nov. 14, 2019, 8 pages.
Examination Report from related EP Application No. 16753641.6, dated Mar. 16, 2020, 9 pages.
Omnexus, Water Absorption 24 Hours, Available Online at: URL: https://omnexus.specialchem.com/polymer-properties/properties/water-absorption-24-hours, 2021, accessed Oct. 15, 2021, pp. 1-12.
Crow's Polymer Properties Database, Polybismaleimides (BMI), Available Online at: URL: https://polymerdatabase.com/polymer%20classes/Polybismaleimide%20type.html, 2015, accessed Oct. 15, 2021, pp. 1-3.
Crow's Polymer Properties Database, Phthalonitriles (PN), Available Online at: URL: https://polymerdatabase.com/Polymer%20Brands/Phthalonitriles.html, 2015, accessed Oct. 15, 2021, pp. 1-3.
Encyclopedia Britannica, Silicone, Available Online at: URL: https://www.britannica.com/science/silicone, Encyclopedia Britannica, Inc., Aug. 30, 2021, accessed Oct. 15, 2021, pp. 1-2.
Joyce, Resins (aka Matrices), Available Online at: https://www.usna.edu/Users/mecheng/pjoyce/composites/Short_Course_2003/3_PAX_Short_Course_Matrix-Materials.pdf, 2003, accessed Oct. 15, 2021, pp. 1-4.
International Search Report in related International Application No. PCT/EP2016/069295 dated Nov. 21, 2016, 4 pages.
Written Opinion in related International Application No. PCT/EP2016/069295 dated Nov. 21, 2016, 7 pages.

* cited by examiner

GASKET

CROSS-REFERENCE TO RELATED APPLICATIONS

This application is the U.S. national phase of International Application No. PCT/EP2016/069295 filed on Aug. 12, 2016, and published on Feb. 23, 2017 as International Publication No. WO 2017/029241 A1, which application claims priority to and the benefit of British Application No. 1514584.0, filed on Aug. 17, 2015, the contents of all which are incorporated herein by reference in their entireties.

FIELD OF THE INVENTION

The present invention relates to gaskets, in particular, but not exclusively, to flange joint sealing gaskets.

BACKGROUND OF THE INVENTION

The use of gaskets in sealing applications is commonplace in many industries. A well-known application for gaskets is to provide fluid sealing between two mating surfaces such as between two ends of adjoining pipes or conduits where they are commonly in the form of a flange joint for ease of assembly and disassembly and for better sealing. A flange joint sealing gasket usually comprises a compressible ring defining an aperture of a size that matches the conduit being sealed and a body that matches the dimensions of the flange mating surfaces.

In high pressure sealing applications, one preferred gasket is known as a Kammprofile gasket. This is effectively a gasket with a series of concentric serrations or a concertina-like profile on one or both facing surfaces. The profile is superimposed onto a solid core, usually metal, by the series of concentric serrations. During the sealing process the overlying softer sealing material of the compressible ring (commonly called the facing) is forced into the gaps between serrations to improve sealing by inducing stress concentrations on the sealing surfaces and sealing micro-imperfections on the flanges. The serrations also minimise lateral movement of the sealing material of the facing, while the metal core provides rigidity and blowout resistance. Such a profile gives the gasket added strength for high pressure applications. Depending on the application the facing may for example be of exfoliated graphite, polytetrafluoroethylene (PTFE), or of a layered silicate material such as mica or exfoliated vermiculite.

The facings in Kammprofile gaskets are required to be compressible, to provide a good seal, and to be resistant to creep. Depending on the intended use of the gaskets, the facings may be required to have one or more good chemical resistance, good high temperature resistance and good dielectric properties.

Another effective gasket is sold by Flexitallic Ltd. under the US and EU Registered Trade Mark 'Change'. This is a significantly improved type of spiral wound gasket having a relatively thick strip or winding of channel shape, in which the base of the channel is thicker than the flanks or wings of the channel. Excellent mechanical properties are achieved. Further information on this type of gasket can be found in WO 2010/100469A.

However, in the opinion of the present inventors it has not proved possible to find materials for facings which have all properties that may be required. For example materials with excellent thermal resistance may not have adequate chemical resistance or good dielectric properties. Examples are graphite and exfoliated vermiculite. These commonly used materials have excellent thermal and chemical resistance but poor dielectric properties; graphite is inherently an electrical conductor, and exfoliated vermiculite contains water, which reduces its dielectric resistance. These properties limit the use of these materials in gaskets requiring good dielectric properties; for example when the flange joints of pipelines require to be electrically isolated; or when cathodic protection is employed. This is especially so when the pipelines contain flammable or explosive materials, such as ethylene oxide, or refined hydrocarbons.

Another material used as a facing material is polytetrafluoroethylene. This has good dielectric properties and good chemical resistance, but there are compromises in relation to its thermal resistance and mechanical properties, which inhibit its use in certain applications.

As a consequence of such limitations there is no facing material that has sufficiently good mechanical properties, chemical resistance and dielectric properties to be used in certain rigorous situations of use; and no universal optimal facing material. Consequently many different types of Kammprofile gaskets or improved spiral wound gaskets ('Change'® gaskets) are offered for use in different situations, and compromises have to be made in relation to the properties of such gaskets.

The present inventors seek to provide a Kammprofile gasket in which some or all of the disadvantages of existing Kammprofile gaskets are overcome.

Alternatively or additionally the present inventors seek to provide an improved spiral wound gasket ('Change'® gasket) in which some or all of the disadvantages of such gaskets are overcome.

SUMMARY

In accordance with a first aspect of the present invention there is provided a gasket:
  having a rigid core formed with an aperture, wherein a set of concentric serrations is provided around the aperture on each side of the core, and wherein a facing is secured to each set of concentric serrations, or
  comprising a spirally wound strip, wherein the strip is of channel shape, having a centre region and lateral regions to each side of the centre region, wherein the through-thickness at the centre region of the strip is greater than the through-thickness at its lateral regions, the strip being wound to form a spiral in which the lateral regions of the strip present opposed spiral serrations, and wherein a facing is secured to each of the spiral serrations; wherein each facing comprises a first layer which is in contact with a respective set of concentric serrations or with a spiral serration and a second layer which is in contact with the first layer.

The provision of the first layer makes it possible to introduce or boost a mechanical, chemical or electrical property which is absent or inadequate in the second layer. For example if the second layer has poor dielectric properties a first layer which has excellent dielectric properties may be used. Preferably the first layer is able to conform to the shape of the concentric serrations or the spiral serrations.

Suitably the first layer is able to resist piercing caused by the concentric serrations or the spiral serrations. The serrations may be designed to assist in achieving this, as will be further described.

Suitably the first layer comprises a pre-formed film. Suitably the material of the second layer and the film of the first layer are brought together to form the facing.

In an alternative embodiment a flowable coating may be applied to the second layer. The flowable coating may dry or cure to form the first layer.

It is important that the first layer has a sufficient thickness to perform its function. Surprisingly we have determined that a relatively thin first layer can make a large difference to the overall properties of the facing. We have found that good performance enhancements can be achieved in embodiments of the invention in which the first layer suitably has a mean thickness of at least 50 µm, and preferably has a mean thickness of at least 75 µm.

It might have been expected that the first layer should be thick in order to make the largest possible difference to the overall properties of the facing. However we have found, surprisingly, that a thick first layer can be detrimental to the functioning of Kammprofile gaskets or of the improved spiral wound gaskets ('Change'® gaskets) in certain respects. We have determined that the first layer suitably has a mean thickness not exceeding 300 µm, preferably not exceeding 200 µm.

Thus we have determined the first layer preferably has a mean thickness in the range 50-300 µm, and most preferably 75-200 µm.

Suitably the first layer is secured to a respective set of concentric serrations or to the respective spiral serration by an adhesive composition.

Suitably the first layer is secured to the second layer by an adhesive composition.

Preferably the first layer and the second layer are secured together to form a consolidated facing, which is then secured to the concentric serrations or to a spiral serration.

Preferably the first layer entirely overlies the second layer, in order to achieve the desired benefit from using the first layer. For example when the second layer is graphite a first layer having good dielectric properties must entirely cover the graphite in order for the gasket to have the dielectric resistance benefit. Suitably the first layer has the same footprint as the second layer, or has a footprint which extends beyond the footprint of the second layer.

Suitable the first layer is of a substantially incompressible or barely compressible material.

Suitably it is of an unexpanded thermoplastic material which is compressible to a very limited extent permitted by its bulk structure.

Suitably the second layer is of a compressible material, and may preferably be in particulate, sheet or fibrous form. In use, when the gasket is located between opposed surfaces of pipes or conduits under a compressive load, the second layer is compressed. Typically, the compression of the second layer in use is within the range 30-90% compression in use, more typically, 40-80%, most typically, between 50-70% compression. In any case, the second layer will typically have more than 30% compression, more typically, more than 40% compression and most typically more than 50% compression in use.

Suitably the mean thickness of the second layer when uncompressed, prior to use, is at least 0.2 mm, preferably at least 0.4 mm, preferably at least 0.5 mm, and in some embodiments at least 0.6 mm.

Suitably the mean thickness of the second layer when uncompressed, prior to use, is up to 4 mm, preferably up to 2 mm, and most preferably up to 1 mm.

Suitably the thickness of the second layer when uncompressed, prior to use, exceeds the thickness of the first layer. Suitably the ratio the thickness of the second layer, when uncompressed, prior to use, to the thickness of the first layer is at least 2, preferably at least 3, and most preferably at least 4.

Suitably the thickness of the second layer when compressed, in use, exceeds the thickness of the first layer. Suitably the ratio the thickness of the second layer, when compressed, in use, to the thickness of the first layer is at least 1.5, and preferably at least 2.

The provision of a third layer, in contact with the opposite side of the second layer to the first layer, is not excluded in the practice of the present invention. When a third layer makes is provided it may introduce or boost a mechanical, chemical or electrical property which is absent or inadequate in the second layer and/or the first layer. When a third layer is employed it may be identical to the first layer or it may be different. If different it is preferably generally as described above for the first layer. However in preferred embodiments the facing consists of the first layer and the second layer only.

A particular difficulty has been in obtaining a Kammprofile gasket or an improved spiral wound gasket ('Change'® gasket) gasket which has good dielectric properties, alongside good mechanical properties, and good thermal and chemical resistance. Preferred embodiments of the invention which will now be described address this particular difficulty, and thus focus on achieving improvement in dielectric properties, whilst maintaining other properties. However it should be understood that this is an illustration of the present invention, and that the principle of using a first layer in order to introduce or boost a property deficient in the material of the second layer is of more general applicability.

In some existing gaskets the single-layer facings are of graphite, which has excellent mechanical properties and thermal and chemical resistance, but, being an electrical conductor, extremely poor dielectric properties. This makes it unsuitable as a gasket for pipelines which must have electrical isolation of flange joints, or cathodic protection systems. This is especially so when the pipelines contain flammable or explosive materials, such as ethylene oxide, or refined hydrocarbons. In other existing gaskets the single-layer facings are of layered silicate products, for example exfoliated vermiculite. However exfoliated vermiculite also has poor dielectric properties due, to water in its structure.

In accordance with the present invention the first layer is preferably formed of a thermoplastic or thermosetting polymer having at least one of high temperature resistance, high chemical resistance and high dielectric strength. Preferred polymers have at least two of high temperature resistance, high chemical resistance and high dielectric strength. Especially preferred polymers have all three of high temperature resistance, high chemical resistance and high dielectric strength.

Suitably the first layer is comprises or consists of a thermoplastic polymer, preferably selected from the following classes:

polyaryletherketone (PAEK) (of which a particularly preferred example is polyetheretherketone, PEEK)
polyimide (PI)
fluorinated ethylene propylene copolymer (FEP)
polyetherimide (PEI)
polyethersulfone (PES)
polytetrafluoroethylene (PTFE)
ethylene-chlorotrifluoroethylene copolymer (E-CTFE)
ethylene-tetrafluoroethylene copolymer (ETFE)
polycarbonate (PC)
polychlorotrifluoroethylene (PCTFE)
polyvinylidenefluoride (PVDF).

Alternatively the first layer may comprise or consist of a thermosetting polymer, preferably selected from the following classes:
silicone polymers
polyimide (thermosetting)
bis-maleimides (BMI)
epoxy polymers
phthalonitrile resins.

The thermoplastic and thermosetting polymers described may be used unfilled, or may be filled with inorganic inclusions, for example glass fibres or glass microspheres. Currently available products include a polycarbonate—30% wt glass fibre film and a polytetrafluoroethylene—25% wt glass fibre film.

The following polymers have good thermal resistance in addition to other suitable properties such as good chemical resistance and dielectric properties, and are preferred for use in the first layer:
polyaryletherketone (PAEK) (of which a particularly preferred example is polyetheretherketone, PEEK)
polyimide (PI)
fluorinated ethylene propylene copolymer (FEP)
polyetherimide (PEI)
polyethersulfone (PES)
polytetrafluoroethylene (PTFE).

Especially preferred polymers for use as the first layer are polyimides (PI) and polyaryletherketones (PAEK), especially polyetheretherketone, PEEK. These materials have excellent dielectric properties, high temperature resistance and chemical resistance, as well as the mechanical properties suitable to retain the integrity of the layer when in contact with the concentric serrations of the Kammprofile during rigorous use conditions. Polyaryletherketones are a class of polymers characterised by the presence of backbone aryl (generally phenyl), ketone and ether groups. They include several important sub-classes of polymers including polyetheretherketones (PEEK), polyetherketones (PEK), polyetherketoneketones (PEKK), polyetheretherketoneketones (PEEKK) and polyetherketoneetherketoneketones (PEKEKK).

Polyetheretherketones (PEEK) are a particularly preferred class of polyaryletherketones for use in the present invention and they may generally be exemplified by the structure:

Films of polyetheretherketone can be sourced from Victrex.

Other polyarylether compounds have the following structures.

Polyetherketones (PEK) have the structure

Polyetherketoneketones (PEKK) have the structure

Polyetheretherketoneketones (PEEKK) have the structure

Polyetherketoneetherketoneketones (PEKEKK) have the structure

Polyimides are formed by reaction between a dianhydride and a diamine, or by reaction between a dianhydride and a diisocyanate and have the general structure:

Polyimides may be thermoplastic or thermosetting.

Polyimides are available in film form under the Trade Mark UPILEX (RTM of Ube Industries). UPILEX which is the product of a polycondensation reaction between biphenyltetracarboxylic dianhydride and diamine and is believed to have the structure:

Fluorinated ethylene propylene copolymers are copolymers of hexafluoropropylene and tetrafluoroethylene. They can be sourced from DuPont.

Polyetherimides are arylene polymers which have backbone ether groups. They can be sourced from Sabic.

Polyethersulfones are characterised by the sub-unit —O-aryl-$SO_2$-aryl. They can be sourced from Goodfellow Corp.

Polytetrafluoroethylenes are polymers of tetrafluoroethylene and can be sourced from DuPont.

Ethylene-chlorotrifluoroethylene copolymers are partially fluorinated, partially chlorinated aliphatic copolymers. They can be sourced from Solvay.

Ethylene-tetrafluoroethylene copolymers are aliphatic fluorinated polymers having a lower degree of fluorination than polytetrafluoroethylene. They can be sourced from DuPont.

Polycarbonates are arylene polymers containing carbonate groups (—O(C=O)—O—) in the polymer backbone. They can be sourced from Tekra.

Polychlorotrifluoroethylenes are aliphatic chlorinated and fluorinated polymers. They can be sourced from Allied Signal.

Polyvinylidenefluorides are aliphatic fluorinated polymers. They can be sourced from Solvay.

Silicone polymers are branched polysiloxane materials and may be sourced from Tego Chemie.

Bis-maleimides (BMI) may be produced by a condensation reaction of a diamine with maleic anhydride. They are a relatively young class of thermosetting polymers. Further information on BMI polymers is available at webpage: https://polycomp.mse.iastate.edu/files/2012/01/6-Bismaleimide-Resins.pdf Epoxy polymers are polymers in which an epoxide-containing precursor, for example bisphenol A or F, is cured by means of a curing agent, typically an acid, acid anhydride, phenol, alcohol, thiol or (most commonly) and amine, Epoxy polymers can be sourced from Alchemie Ltd.

Phthalonitrile resins are derived from bis-phthalonitrile monomers and a variety of curing agents, including aromatic polyamines. Further information is available at webpage: Fire Performance of Phthalonitrile Resins/Composites, S. B. Sastri, J. P. Armistead, T. M. Keller and U. Sorathia, made available at webpage: http://fire.nist.gov/bfrlpubs/fire96/PDF/f96127.pdf Preferred polymers for use in the present invention have an extension to break value of at least 50%, preferably at least 100%, and most preferably at least 200%, when tested for tensile properties in accordance with the method of ASTM F152-95(2009). It is believed that the ability of the first layer to stretch is response to applied stress is of importance in achieving good results in a gasket assembly.

In accordance with the present invention the second layer may be selected from a wide range of materials, including materials having poor dielectric properties, and which previously would have been excluded from certain application areas requiring high dielectric strength. Preferably the materials of the second layer have excellent thermal resistance. Preferred materials for the second layer are inorganic materials, including layered silicates, ceramics and graphite.

Especially preferred materials for the second layer include layered silicates and graphite. The term layered silicate in this specification includes micas and vermiculites. Mixtures of such materials could be employed. It should be noted that the term vermiculite in this specification includes materials that may sometimes be called biotite, hydrobiotite and phlogopite (nomenclature in this area being contentious). Micas are of interest for their good dielectric properties, Preferred vermiculite for use in the present invention is or comprises exfoliated vermiculite, which may be chemically exfoliated vermiculite (CEV), or thermally exfoliated vermiculite (TEV), or a mixture of CEV and TEV. It may be mixed with other minerals. Thus, other preferred materials include exfoliated vermiculite (which may comprise CEV, or TEV, or a mixture of CEV and TEV), in admixture with other minerals, for example one or more of talc, mica and graphite.

Especially preferred materials for the second layer include exfoliated vermiculite and exfoliated graphite; in each case as such or admixed with further mineral materials.

Thus, even if the material of the second layer has poor dielectric properties, the gasket can still have good dielectric properties overall on selection of a suitable material for the first layer.

In one preferred embodiment the first layer comprises or consists of polyimide and the second layer comprises or consists of exfoliated vermiculite.

In one preferred embodiment the first layer comprises or consists of polyetheretherketone and the second layer comprises or consists of exfoliated vermiculite.

In one preferred embodiment the first layer comprises or consists of polyimide and the second layer comprises or consists of exfoliated graphite.

In one preferred embodiment the first layer comprises or consists of polyetheretherketone and the second layer comprises or consists of exfoliated graphite.

In another embodiment the first layer comprises or consists of polytetrafluoroethylene and the second layer comprises or consists of exfoliated vermiculite.

In another embodiment the first layer comprises or consists of polytetrafluoroethylene and the second layer comprises or consists of exfoliated graphite.

It was mentioned above that polytetrafluoroethylene has good dielectric properties and good chemical resistance but there are compromises in relation to its thermal resistance and mechanical properties, which inhibit its use in certain rigorous applications. That statement related the use of polytetrafluoroethylene as the facing material. Polytetrafluoroethylene may still be of value, in the present invention, as the material of the first layer of the facing. A polytetrafluoroethylene first layer can enhance the dielectric and chemical resistance of the facing but in preferred embodiments of the present invention it does not form the major or entire mass of the facing, and does not determine its bulk properties.

As indicated above and in claim 1, the invention may be put into practice with the type of gasket which has a rigid core formed with an aperture, with a set of concentric serrations around the aperture on each side of the core; that is, a Kammprofile gasket. The paragraphs which follow describe Kammprofile gaskets which are particularly suitable for use in the present invention.

In accordance with the present invention, and in contrast to many existing Kammprofiles, the concentric serrations preferably do not have sharp peaks.

In one embodiment in accordance with the present invention the concentric serrations of a Kammprofile may have peaks which terminate in rounded tips, or in cut-off or truncated tips, or they may be of generally smooth or rounded profile in transverse cross section (the radial cross-section of the Kammprofile). Where there are two faces of each serration which come to a peak, they suitably subtend an obtuse angle, preferably at least 100°.

In accordance with the present invention, and in contrast to existing Kammprofiles, the concentric serrations do not terminate in sharp troughs.

In one embodiment in accordance with the present invention the concentric serrations may terminate in rounded troughs, or in cut-off or truncated troughs, or they may be of generally smooth or rounded profile in transverse cross section (the radial cross-section of the Kammprofile). Where there are two faces of each corrugation which come to a trough they suitably subtend an obtuse angle, preferably at least 100°.

Such embodiments represent a rethinking of the shape of the corrugated part of the Kammprofile; but they still employ a peak-and-trough profile. In alternative embodiments, however, there may be no peaks, only troughs. Thus in such an embodiment the concentric serrations of the Kammprofile are in the form of concentric grooves, preferably rounded in transverse cross section (the radial cross-section of the Kammprofile) and preferably separated by concentric flat portions. Suitably, in this embodiment, the Kammprofile surface is not formed by machining the surface to form peaks and troughs, but is routed to form only the concentric grooves. Preferably the concentric grooves define in their transverse cross-section the arc of circles, preferably of 90 to 180° arc, preferably 100 to 160° arc.

The core of a Kammprofile gasket which may be used in the present invention can be of any design. For example, it could be a ring-shape substantially matching the ring-shape of the facings; it could have an integral root core extending beyond the serrations and the facings; it could have a separate, loose fitting root core extending beyond the serrations and the facings; or it could have projections or lugs extending outwardly, beyond the serrations and the facings. The core of the gasket is suitably steel.

As indicated above, and in claim 1, the invention may be put into practice with another type of gasket: one which has a spirally wound strip, wherein the strip is of channel shape which is wound up in a nested manner. Such a channel shaped strip (which could also be called a trough shaped strip) has a centre region and lateral regions to each side of the centre region. In some embodiments there may be a discontinuity between the each lateral region and the centre region; for example a curve or bend, or a well-defined angle. In other embodiments the strip may be smoothly curved from one side to the other, but can still be said to have a centre region between respective lateral regions. Suitably the through-thickness of the strip at its centre region is greater than its through-thickness at its lateral regions. When the strip is wound to form a spiral its lateral regions present opposed spiral serrations, with which respective facings may be engaged. Such a gasket is an improved spiral wound gasket and such a gasket as sold by Flexitallic Ltd is known as a 'Change'® gasket. The geometric arrangement means that the side regions are able to flex under relatively lower pressures and the thicker centre region is able to flex under relatively higher pressures.

The paragraphs which follow describe such improved spiral wound gaskets which are particularly suitable for use in the present invention.

Suitably such a gasket has a plurality of revolutions (or windings of the strip). For example it may have at least 6 complete revolutions, and suitably at least 8 complete revolutions.

Suitably a plurality of the outer windings may be secured together, for example by spot welding. Suitably these conjoined outer windings are in direct contact with each other. Suitably, therefore, they have no interleaving material.

Suitably a plurality of the inner windings may be secured together, for example by spot welding. Suitably these conjoined inner windings are in direct contact with each other. Suitably, therefore, they have no interleaving material.

Intermediate windings, that is, windings between the conjoined outer windings and the conjoined inner windings, can be secured together, but need not be secured together. These intermediate windings may be in direct contact with each other, without interleaving material; Alternatively the intermediate windings may be separated by an interleaving packing material, for example exfoliated graphite, exfoliated vermiculite, thermally exfoliated vermiculite, PTFE or any other packing material known in the art. The descriptions and definitions of such materials given elsewhere in this specification are applicable to these materials when used as interleaving packing materials between windings.

This type of spiral gasket has a high degree of rigidity arising from the spirally wound strip. High performance embodiments may have only the spirally wound section. That is, there may be no rigid core or guide ring on the inside or outside of the spirally wound section. In other embodiments the gasket may include a rigid core or guide ring on the outside of the spirally wound section. In other embodiments the gasket may include a rigid core or guide ring on the inside of the spirally wound section. In other embodiments the gasket may include rigid cores or guide rings on both the outside and the inside of the spirally wound section. Such cores or guide rings may be of solid plate metal and may be provided for reasons of geometry or handling. However it is important to emphasise that the spirally wound section on its own, without inner or outer cores or guide rings, is a highly effective gasket for many technical applications.

The strip may suitably be of steel, but the use of other materials is not excluded.

The overall dimensions of this type of gasket can vary greatly, depending on the technical application. The inner diameter of the spirally wound section may suitably be from 1 cm to 5 m; suitably from 2 cm to 4 m (metres); suitably from 2.5 cm to 3 m. Excellent properties are achieved across these large size spans.

Suitably the radial width (which may also be called land width) of the spirally wound section of this type of gasket is in the range from 0.6 cm to 7 cm, suitably from 0.8 cm to 5 cm, suitably from 1 cm to 3 cm.

Suitably the thickness of the spirally wound section of this type of gasket is in the range from 0.1 cm to 2 cm, suitably from 0.2 cm to 1.5 cm, suitably from 0.25 cm to 1 cm, suitably from 0.3 cm to 0.8 cm, suitably from 0.25 cm to 0.6 cm, suitably from 0.3 cm to 0.5 cm. Since this spirally wound section is made up of a plurality of windings its thickness is equal to the maximum thickness of the strip which forms the spirally wound section.

As noted above in the 'spiral' embodiments of this invention the strip which forms the spirally wound region is of channel form. It may have two straight or generally straight lateral regions or flanks and a generally curved centre region between them. In alternative embodiments it may be curved throughout its cross-section. In all embodiments the lateral regions are of smaller through-thickness than the centre region. Suitably the ratio of the through-thickness of the centre region to the trough-thickness of the lateral regions is at least 1.2 to 1, suitably at least 1.4 to 1, and in some embodiments at least 1.5. In absolute terms, the through-thickness of the lateral regions is suitably at least 0.4 mm, suitably at least 0.5 mm; and suitably up to 1 cm, for example up to 0.8 cm. The through-thickness of the centre region is suitably at least 0.7 mm, suitably at least 0.8 mm, and in some embodiments at least 0.9 mm; and suitably up to 1.4 cm, for example up to 1.2 cm.

For the purpose of any geometrical definitions given in this specification for the channel shaped strip, if the through-thickness of any such region varies the minimum value which can apply to the region is to be taken.

At least one and suitably both faces of the strip may include arcs. Where both include arcs the radius of each arc may be the same or different.

Suitably each lateral region of the strip terminates in an end face. Suitably the end faces of the two lateral regions are orthogonal to each other. Suitably the junction of the outer surface of each lateral region and its adjacent end face is formed with a chamfer. By outer surface we mean the surface which forms part of the generally concave surface of the strip of channel shape. Suitably each chamfer is oblique to the adjacent end face and to the adjacent outer surface of the lateral region. Suitably the width of the chamfers is in the range from 0.06 mm to 0.3 mm, suitably from 0.08 mm to 1.5 mm. The provision of these chamfers is so that the spirally wound sections, which will be in contact with the facings, do not present sharp edges to the facings. In an alternative embodiment the chamfers may not be present but the same edge may be rounded or dulled. The width of the rounded or dulled regions may be as described above for the chamfers.

The width or the average width of the strip relative to the height of the strip may be more than 1:2 or 1:3 or 1:4 or in the region of 1:5.

A gasket of the spiral type used in the present invention may comprise a first and a second spirally wound strip wound together in interleaved manner. At least one of the strips is arranged, in use, to be clamped between opposed faces to seal those faces. The first and second spirals may have different properties. Suitably the strips afford different resistance to the clamping force.

A gasket of the spiral type used in the present invention may comprise one of the first or second strips being of greater height than the other of the first or second strip prior to the clamping force being applied with the height of the strips being the same as the under the applied clamping force.

Suitably each facing overlies the entire spiral-shaped peak formed by the spiral winding. That is, each facing suitably completely covers the spiral-shaped peak. Suitably each facing extends radially beyond the inner extent of the spiral-shaped peak in the inwards direction and extends radially beyond the outer extent of the spiral-shaped peak in the outwards directions (the peak being the junction of the outer surface of each lateral region and its adjacent end face). However the extent of projection beyond the peak on the inner side should not be such as to interfere with the flow of material in the pipe or conduit.

The gasket of the present invention, whichever the gasket type is, may be required to operate under normal operating pressures between 100 KPa and 43,000 KPa, more typically between 10,000 KPa and 20,000 KPa.

In accordance with a second aspect of the present invention there is provided a method of producing a gasket of the first aspect, comprising:

providing a core having an aperture and a set of concentric serrations around the aperture on each side of the core, or providing a spirally wound strip, wherein the strip is of channel shape, having a centre region and lateral regions to each side of the centre region, wherein the through-thickness in the centre region of the strip is greater than its through-thickness at its lateral regions, the strip being wound to form a spiral in which the lateral regions of the strip present a spiral serration on each side of the spiral;

forming two consolidated facings each comprising a first layer and a second layer; and securing the consolidated facings over to the gasket, with the first layers being put in contact with the respective sets of concentric serrations or with the two spiral serrations.

In accordance with a third aspect of the present invention there is provided the use of a gasket of the first aspect as a sealing gasket which can be used at temperatures of least 120° C. and to provide resistance to electrical breakdown on application of a potential difference of at least 15 kV applied across the thickness of the film.

In accordance with a fourth aspect of the present invention there is provided the use a sealing gasket which can be used at temperatures of least 200° C. and to provide resistance to electrical breakdown on application of a potential difference of at least 25 kV applied across the thickness of the film.

Suitably the third and fourth aspects use sealing gaskets which also have good mechanical properties and chemical resistance.

The invention will now be further described, by way of example, with reference to the accompanying drawings.

DETAILED DESCRIPTION

Figure 1:
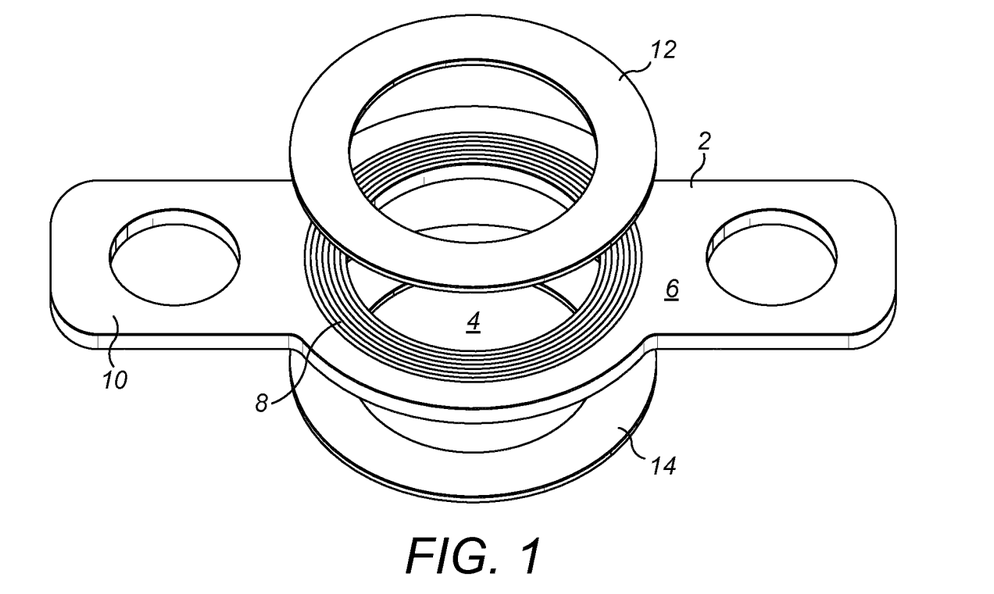
FIG. 1 shows in expanded perspective view the core of a gasket formed with concentric serrations on each of its opposed faces; and two facings therefor for sealing against the respective concentric serrations.

FIG. 1 shows a steel core 2 of a "Kammprofile" gasket. The steel core has a large centre aperture and upper and lower faces, of which the upper face 6 is visible. It can be seen that the upper face 6 is formed with concentric "Kammprofile" serrations 8 around the aperture 4. The lower face, not visible, is identical to the upper face 6. The steel core has two diametrically opposed lugs 10, but these are not of significance in the present invention.

Also shown in FIG. 1 are upper and lower facings 12, 14. These are identical rings of sealing material and are designed to engage over the concentric serrations formed in the upper face 6 and lower face of the core 2, respectively.

The nature of the concentric serrations, and of the facings, will now be described in greater detail.

Figure 2:
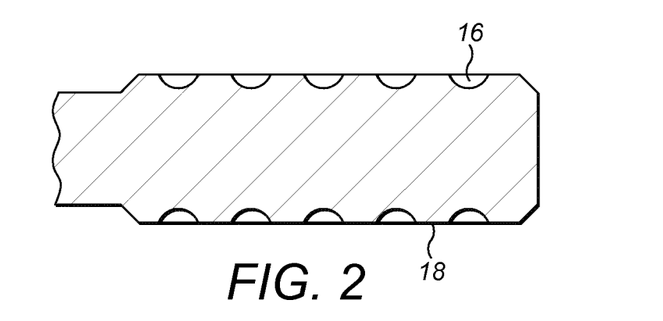
FIG. 2 is a cross-sectional view of the core of the gasket of FIG. 1.

It is important to note that the concentric serrations do not have abrupt edges, for example formed by faces coming together at an angle of 90°, or less. They are not of "peak-and-trough" or "zig-zag" configuration. Rather, the concentric serrations are in the form of concentric grooves 16, separated by concentric flat portions or lands 18. Suitably the Kammprofile surface is not formed by machining the surface to form peaks and troughs, but is routed to form the concentric grooves. Each concentric groove has a cross-section which is the arc of a circle, and in this embodiments each arc is 120° of a circle. In this embodiments there are five such concentric grooves on each side of the core.

Figure 3:
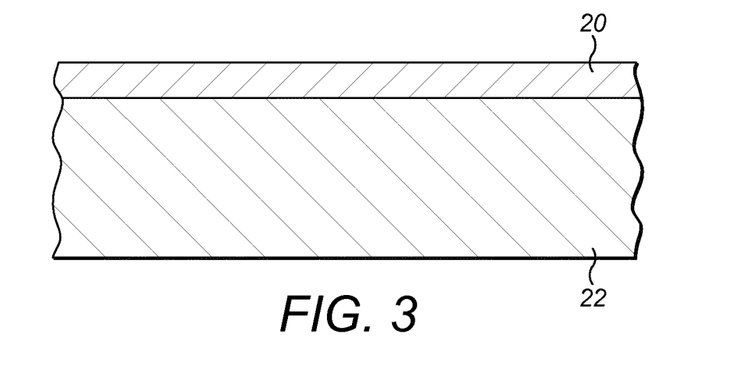
FIG. 3 is a cross-sectional view through one of the facings shown in FIG. 1.

FIG. 3 is a cross-sectional view of one of the facings. It shows the two layers of the facing. On assembly of the gasket the first layer 20 comes directly into contact with the Kammprofile serrations, and is bonded thereto by a spray adhesive. The first layer 20 is bonded to the lower layer 22 by a spray adhesive.

Although the drawings are not to scale it can correctly be correctly deduced from FIG. 3 that the first layer 20 is thin and the second layer 22 is thicker. In favoured embodiments of this invention which will be described further the mean thickness of the first layer Is 25 μm, 50 μm, 75 μm, 125 μm and 200 μm; and the mean thickness of the second layer Is 0.5 mm.

In favoured embodiments of the invention which will be described further the materials employed for the first layer were polyetheretherketone and polyimide polymers.

The materials employed for the second layer were exfoliated graphite or exfoliated vermiculite. Such materials are compressible, and on assembly and installation of the gasket are typically compressed by from 40% to 80% thickness. Compression is accompanied by the filling of the troughs of the Kamm profile and by the spreading of the facing material across the faces of the gasket.

As was noted above exfoliated graphite and exfoliated vermiculite have many excellent properties for use in the facing of a gasket, notably excellent mechanical properties, high thermal resistance and very good chemical resistance. They do not have good dielectric properties. However the polyetheretherketone and polyimide polymers of the first layer of the consolidated facing of FIG. 3 have excellent dielectric properties. Accordingly a consolidated facing as described herein can have all-round excellent properties.

On compression of the gasket the concentric serrations apply force to each facing, and this force is directly applied to the first layer. If the first layer were to be pierced the benefit arising from the first layer could be lost, and the performance of the gasket compromised. However this is prevented by the design of the concentric serrations, comprising concentric grooves without abrupt edges, allied to the excellent mechanical properties of the preferred polytetrafluoroethylene and polyimide polymers.

The efficacy of polyetheretherketone and polyimide films as dielectric materials in facings was investigated by a laboratory test employing an anode and cathode applied to opposed surfaces of the facings. Alternating voltage at a commercial power frequency (60 Hz) was applied to a test specimen. The specimens under test were 25 mm square and had been conditioned by placing in an oven at 100° C. for 1 hour before placing in a desiccator. The anode and cathode electrodes consist of opposing cylindrical rods 6.4 mm in diameter with edges rounded to 0.8 mm radius. The electrodes were made from stainless steel. The anode and cathode were applied to opposed surfaces of the test specimens to give a high potential difference. The potential difference was increased until breakdown occurred. The start voltage for the test was 2.5 kV and was held for a total of 10 secs. If no failure was detected, the voltage was increased by 0.5 kV and again held for 10 secs. This was repeated until dielectric failure of the test specimen occurred. Failure usually occurred within 1-2 secs of applying the voltage. On breakdown dielectric resistance was greatly reduced or lost entirely and a high current was permitted to flow. This high current was signalled by a sounder and by a light, each connected in the circuit.

The tests were carried out at 20° C. and 75% relative humidity.

Results were as follows.

| Polymer | Film thickness (mm) | Voltage reading at breakdown (kV) |
|---|---|---|
| Polyimide - Upilex 25 RN | 0.025 | 8 |
| Polyimide - Upilex 50 RN | 0.05 | 19.5 |
| Polyimide - Upilex 75 RN | 0.075 | Did not break down up to 25 |
| Polyimide - Upilex 125 RN | 0.125 | Did not break down up to 25 |
| PEEK - 0.075 mm | 0.075 | 24.5 |
| PEEK - 0.2 mm | 0.2 | Did not break down up to 25 |

The dielectric properties of these materials make them suitable to supply dielectric resistance to facings in which the second layer has poor dielectric resistance.

A conjoined facing having a first layer and a second layer as described has excellent strength and creep resistance, including ability to withstand high operating pressures, excellent thermal and chemical resistance, as well as dielectric resistance. If there is ever a thermal event which compromises the thermoplastic polymer of the first layer it is of benefit that this layer is relatively thin, and the second layer, which suitably comprises exfoliated graphite or exfoliated vermiculite, which have the property of natural resilience, can pack into intimate contact with the concentric serrations, to maintain the seal until repair can take place.

Figure 4:
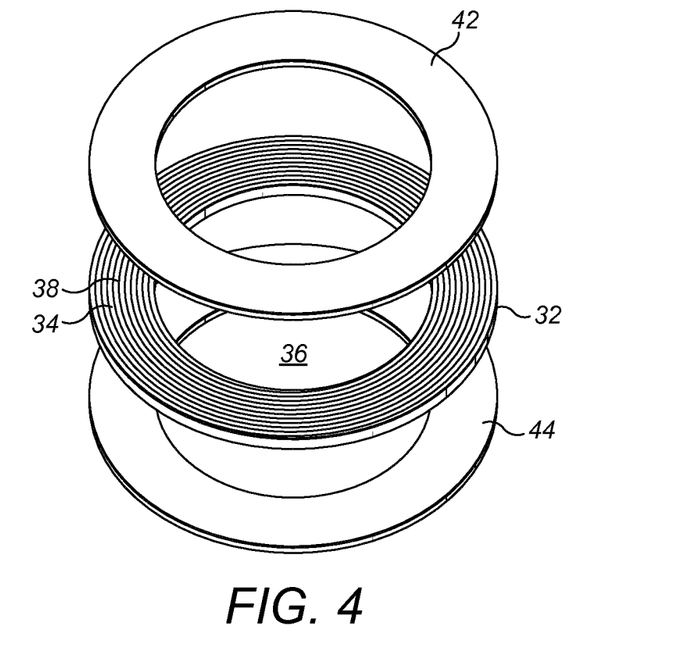
FIG. 4 shows in expanded perspective view a gasket formed by a spiral winding and so having a spiral serration on each of its opposed faces; and two facings therefor for sealing against the respective spiral serrations.
Figure 5:
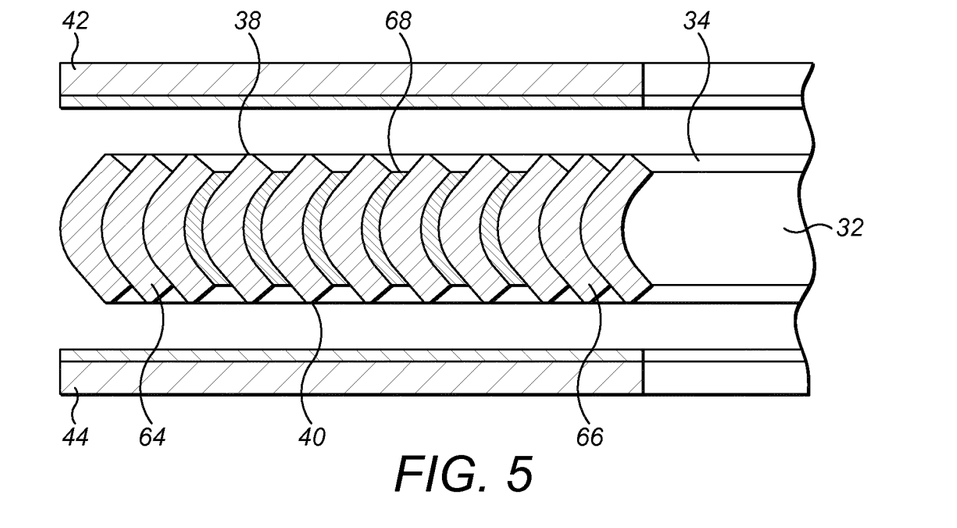
FIG. 5 is a cross-sectional view through a part of the gasket of FIG. 4.

FIGS. 4 and 5 show a spiral wound gasket 32. The gasket is formed by a steel strip 34 wound into a spiral. It is wound to have a large central aperture 36. Its upper and lower faces each has a continuous spiral serration 38, 40, formed by the lateral edges of the strip.

Also showing in FIGS. 4 and 5 are upper and lower facings 42, 44. These are identical rings of sealing material and are designed respectively to engage over the spiral serrations 38, 40 with a slight projection beyond them in the inward and outward directions, respectively. The facings 42, 44 are as described for the embodiment of FIGS. 1 to 3.

FIGS. 4 and 5 do not show a traditional spiral wound gasket, but an improved type of spiral wound gasket having a relatively thick strip of channel shape, wound together in nested fashion, in which the base of the strip 46 is thicker than the lateral regions, which may also be called the flanks or wings 48, 50, of the strip. This can be seen in FIG. 5 and in the expanded view of FIG. 6.

Figure 6:
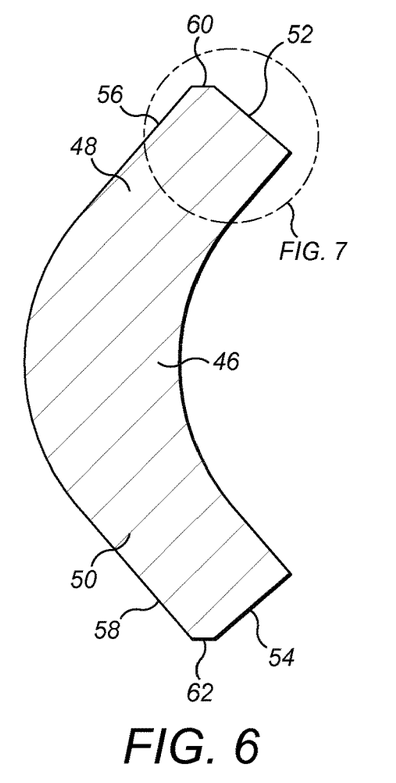
FIG. 6 is an larger scale view of the end face of a strip which when wound into a spiral can form the gasket of FIG. 5.

It can be seen in FIG. 6 that the strip is generally curved from one side to the other, except for the flanks or wings 48, 50 which are approximately straight. The curved regions are arcs which may be of the same radius, but are centred at positions selected such that the through-thickness of the strip is at its maximum at the centre of the base of the strip, and decreases in the lateral directions.

Each flank or wing 48, 50 terminates in an end face 52, 54. The end faces are orthogonal to each other. The junction of the outer face 56, 58 of each flank or wing and its adjacent end face is formed with a chamfer, 60, 62 of which one can be seen most clearly in the expanded view of FIG. 7. Each chamfer is oblique to its adjacent end face and to its adjacent outer surface of the lateral region. It will be apparent from FIG. 5 that when the gasket is put into use the facings 42, 44 first engage the chamfers of the spiral serrations, which do not present sharp edges to the facings.

Figure 7:
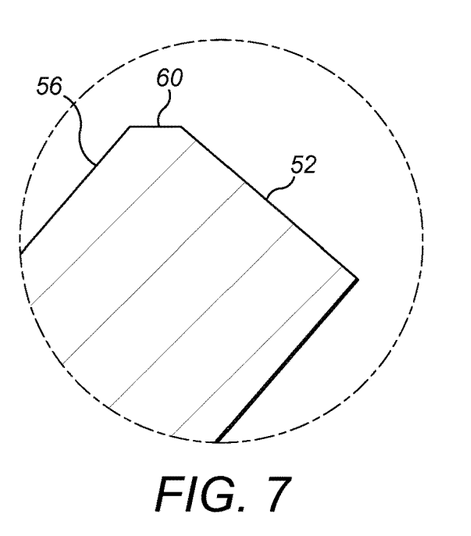
FIG. 7 is an expanded view of a detail of the gasket of FIG. 6.

In this embodiment the maximum width of the strip, from chamfer 60 to chamfer 62, is 3.18 mm. The width of the end faces 52, 54 is 0.59 mm. The width of the base of the strip, in its centre, is 0.83 mm. The width of the chamfers is 0.1 mm.

The strip is wound to form a tight spiral, which channel formation nested into channel formation. Outermost and innermost windings are 64, 66 are wound up metal on metal, without any interleaving material, and are secured together by spot welding. Intermediate windings have an interleaving material 68, which in this embodiment is exfoliated graphite.

When the gasket is put under load the interleaving material 68 is squeezed outwards and meets the material of the facings. The facings engage the chamfers and are not pierced by the spiral windings.

As noted above the two-layer facing as described has excellent strength and creep resistance, including ability to withstand high operating pressures, excellent thermal and chemical resistance, as well as dielectric resistance. If there is ever a thermal event which compromises the thermoplastic polymer of the first layer it is of benefit that this layer is relatively thin, and the second layer, which suitably comprises exfoliated graphite or exfoliated vermiculite, which have the property of natural resilience, can pack into intimate contact with the spiral serrations, to maintain the seal until repair can take place. The benefits of this type of facing are as significant to the rigid spiral embodiment of FIGS. 4-7 as they are to the Kammprofile embodiment of FIGS. 1 to 3.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket comprising a body comprising a top surface, a bottom surface, and an aperture, wherein the top and bottom surfaces each comprise serrations around the aperture, the gasket further comprising a first facing secured over the serrations on the top surface, a second facing secured over the serrations on the bottom surface, and an adhesive;
   wherein each facing comprises a first layer which is in contact with the respective top or bottom surface serrations and a second layer which is in contact with the first layer opposite the respective top or bottom surface,
   wherein the adhesive secures each first layer to the respective top or bottom surface serrations or secures each first layer to the respective second layer,
   wherein each first layer comprises a substantially incompressible polymer film with a mean thickness of at least 75 µm and not exceeding 300 µm,
   wherein the substantially incompressible polymer film comprises at least one of
   polyaryletherketone (PEAK);
   polyetheretherketone (PEEK);
   polyimide (PI);
   fluorinated ethylene propylene copolymer (FEP);
   polyetherimide (PEI);
   polyethersulfone (PES);
   polytetrafluoroethylene (PTFE);
   ethylene-chlorotrifluoroethylene copolymer (E-CTFE);
   ethylene-tetrafluoroethylene copolymer (ETFE);
   polycarbonate (PC);
   polychlorotrifluoroethylene (PCTFE);
   polyvinylidenefluoride (PVDF);
   silicone polymers;
   polyimide (thermosetting);
   bis-maleimides (BMI);
   epoxy polymers; or
   phthalonitrile resins,
   wherein each second layer comprises a compressible inorganic material, and
   wherein the thickness of the second layer when uncompressed, prior to use, exceeds the thickness of the first layer.

2. The gasket according to claim 1, wherein the first layer comprises a mechanical, chemical, or electrical property which is absent or inadequate in the second layer.

3. The gasket according to claim 1, wherein the first layer can conform to a shape of the serrations and can resist piercing caused by the serrations.

4. The gasket according to claim 1, wherein the first layer is formed by drying or curing a flowable coating composition.

5. The gasket according to claim 1, wherein a thickness of the second layer can be compressed in use from a relative thickness of at least 2:1 as compared to the first layer to a relative thickness of at least 1.5:1 as compared to the first layer.

6. The gasket according to claim 1, wherein the substantially incompressible polymer film comprises at least one of a polyimide, a polyaryletherketone, or a polyetheretherketone.

7. The gasket according to claim 1, wherein the second layer comprises at least one of layered silicates, a ceramic, or a graphite.

8. The gasket according to claim 7, wherein the second layer comprises a layered silicate, and wherein the layered silicate comprises mica, a vermiculite, or a mixture thereof.

9. The gasket according to claim 1, wherein the body further comprises a rigid core, wherein the serrations on the top and bottom surfaces comprise concentric serrations in the rigid core, and wherein each facing is secured to a respective set of concentric serrations on the top or bottom surface.

10. The gasket according to claim 9, wherein the serrations comprise concentric grooves of rounded cross-section, wherein the concentric grooves are separated by concentric flat portions.

11. The gasket according to claim 1, wherein the body further comprises a spirally wound strip, wherein the strip is of channel shape, having a centre region and lateral regions to each side of the centre region, wherein a through-thickness at the centre region of the strip is greater than the through-thickness at its lateral regions, the strip wound in a spiral, wherein the lateral regions of the strip form opposed spiral serrations that form the serrations on the top and bottom surfaces, and wherein each facing is secured to a respective set of spiral serrations.

12. The gasket according to claim 11, wherein the through-thickness of the centre region of the spirally wound strip is at least 0.7 mm; and the ratio of the through-thickness of the centre region to the through-thickness of the lateral regions is at least 1.2 to 1.

13. The gasket according to claim 11, wherein the spiral serrations on the top and the bottom surfaces of the body comprise peaks which engage the facings, wherein the peaks are at least one of chamfered, dulled, or rounded.

14. A method of producing a gasket comprising:
forming first and second consolidated facings each comprising a first layer and a second layer; and
securing the consolidated facings over a gasket body comprising a top surface, a bottom surface, and an aperture, wherein the top and bottom surfaces each comprise serrations around the aperture,
wherein the first consolidated facing is secured on the top surface and the second consolidated facing is secured on the bottom surface with the first layers being put in contact with the respective serrations on the top or bottom surface,
wherein the first and second consolidated facings are secured on the top and bottom surfaces with an adhesive,
wherein each first layer comprises a substantially incompressible polymer film with a mean thickness of at least 75 μm and not exceeding 300 μm,
wherein the substantially incompressible polymer film comprises at least one of
polyaryletherketone (PEAK);
polyetheretherketone (PEEK);
polyimide (PI);
fluorinated ethylene propylene copolymer (FEP);
polyetherimide (PEI);
polyethersulfone (PES);
polytetrafluoroethylene (PTFE);
ethylene-chlorotrifluoroethylene copolymer (E-CTFE);
ethylene-tetrafluoroethylene copolymer (ETFE);
polycarbonate (PC);
polychlorotrifluoroethylene (PCTFE);
polyvinylidenefluoride (PVDF);
silicone polymers;
polyimide (thermosetting);
bis-maleimides (BMI);
epoxy polymers; or
phthalonitrile resins,
wherein each second layer comprises a compressible inorganic material, and
wherein the thickness of the second layer when uncompressed, prior to use, exceeds the thickness of the first layer.

15. The gasket according to claim 1, wherein the first layer has a mean thickness of at least 75 um and not exceeding 200 um.

16. The gasket according to claim 5, wherein the thickness of the second layer can be compressed in use from a relative thickness of at least 4:1 as compared to the first layer to a relative thickness of at least 2:1 as compared to the first layer.

17. The gasket according to claim 8, wherein the vermiculite comprises at least one of an exfoliated vermiculite, a biotite, a hydrobiotite, and a phlogopite.

18. The gasket according to claim 1, wherein the substantially incompressible polymer film comprises an unexpanded thermoplastic or thermosetting polymer.

19. The gasket according to claim 1, wherein the substantially incompressible polymer film comprises at least one of
polyaryletherketone (PEAK);
polyetheretherketone (PEEK);
polyimide (PI);
fluorinated ethylene propylene copolymer (FEP);
polyetherimide (PEI);
polyethersulfone (PES);
ethylene-chlorotrifluoroethylene copolymer (E-CTFE);
ethylene-tetrafluoroethylene copolymer (ETFE);
polycarbonate (PC);
polychlorotrifluoroethylene (PCTFE);
polyvinylidenefluoride (PVDF);
silicone polymers;
polyimide (thermosetting);
bis-maleimides (BMI);
epoxy polymers; or
phthalonitrile resins.

* * * * *